3,149,163
AMINE AND ORGANO-SUBSTITUTED HYDRAZINE SALTS OF THE $B_{10}H_{10}^{-2}$ ANION AND PROCESS FOR PREPARING SAME
Walter Henry Knoth, Jr., Mendenhall, Pa., assignor to E. I. du Pont de Nemours and Company, Wilmington, Del., a corporation of Delaware
No Drawing. Filed Feb. 5, 1960, Ser. No. 6,854
10 Claims. (Cl. 260—583)

This invention is directed to ionic boron compounds and methods for their preparation. More particularly, it is directed to methods for preparing amine and organo-substituted hydrazine salts of a boron hydride anion and to certain novel and highly useful salts prepared by these methods.

A number of amines are known to form adducts with decaborane without loss of hydrogen to form $B_{10}H_{14}$ complexes that decompose in contact with water. Certain cyclic amines, e.g., pyridine, are also known to react with decaborane to form $B_{10}H_{12}$ and $B_{10}H_{14}$ adducts; however, the $B_{10}H_{12}$ adducts are soluble only to a limited extent in water and are non-ionic.

The present invention provides a novel class of ionic salts of the $B_{10}H_{10}^{--}$ anion which are highly water-soluble. The novel salts of this invention are amine and organo-substituted hydrazine salts of the $B_{10}H_{10}^{--}$ anion having the general formula (1) 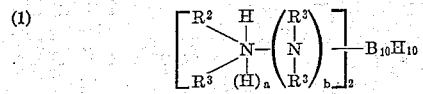

wherein $a$ and $b$ are integers whose sum is equal to 1, i.e., $a$ and $b$ are zero or 1; $R^2$ is a monovalent hydrocarbon such as an alkyl, alkenyl, cycloalkyl, cycloalkenyl, aryl, alkaryl or aralkyl group; $R^3$ is hydrogen or a group as defined for $R^2$. In a preferred group of compounds the substituents $R^2$ and $R^3$ have at most 12 carbons.

The novel compounds are further characterized as selected from the group consisting of

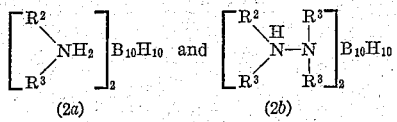

(2a) (2b)

where $R^2$ and $R^3$ have the meanings defined earlier and wherein the groups bonded to $B_{10}H_{10}^{=}$ are derived from primary amines, secondary amines and organo-substituted hydrazines which can form salts with hydrochloric acid.

The compounds of the invention can be prepared by a single step process or by a multiple step process, as illustrated in the following schematic diagram.

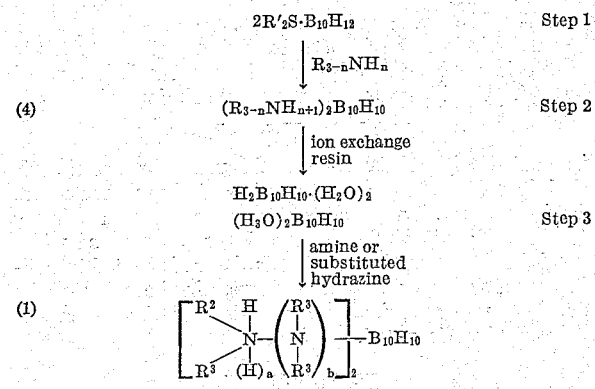

The group $R_{3-n}NH_{n+1}$ in the above formula represents the cation derived from an amine of the formula (3) $R_{2-n}NH_n$ where R is an alkyl, alkenyl, cycloalkyl or cycloalkenyl group; $n$ is an integer of at most 2, i.e., $n$ can be 0, 1 or 2. The R groups, preferably, have at most 12 carbons.

Step 1, in the above process outline, permits the preparation of salts from primary, secondary and tertiary aliphatic or cycloaliphatic amines. Step 3 in the process permits the preparation of salts, not only from aliphatic and cycloaliphatic amines, but also from aryl substituted amines and from substituted hydrazines. Thus, salts which fall within the scope of the invention, if not obtainable directly by step 1, can be obtained by employing steps 1, 2 and 3 shown.

The method of Step 1 relates to the reaction of one mole of a decaboryl bis(organic sulfide) having the formula (5) $B_{10}H_{12} \cdot 2(R')_2S$ where R' is a monovalent hydrocarbon radical, preferably of at most 8 carbons, with at least two moles (based on available amine groups) of an amine compound of the formula $R_{3-n}NH_n$ where R and $n$ have the meanings previously defined (3).

The salts derived from primary and secondary amines are obtained in substantially higher yields and they are substantially more soluble in water than the salts derived from tertiary amines. Because of the advantage of high yield and high water-solubility, these salts form a preferred group of novel compounds which are part of this invention. This preferred group of salts are represented by the formula (6) $(R_{4-x}NH_x)_2B_{10}H_{10}$ wherein R has the meaning defined previously (3), and $x$ has a value of 2 or 3. In an especially preferred group of amine salts of the above formula, each R represents an alkyl group of less than 7 carbons.

As stated earlier, a broad range of amine salts and of organo-substituted hydrazine salts of the $B_{10}H_{10}^{--}$ anion of this invention can be prepared by neutralization of the acid $H_2^{++}B_{10}H_{10}^{--} \cdot (H_2O)_m$, where $m$ is 2 or 3, with an appropriate nitrogen base. Thus, for preparation of substituted hydrazine salts the acid is neutralized in aqueous solution with an organo-substituted hydrazine of the formula (8) 

wherein $R^2$ and $R^3$ have the meanings given earlier (2b). The substituted hydrazine salt that forms remains in solution in the reaction mixture and can be isolated by conventional methods.

The organo-substituted hydrazine salts have the formula given earlier (see 2b) and these salts also form a part of this invention.

The salts obtained by the processes of this invention, including both the amine and organo-substituted hydrazine salts, are stable, non-hygroscopic, crystalline white solids which are very soluble in water. The salts do not reduce silver nitrate in aqueous solution, a behavior which is a sharp contrast with the reducing action of other boron hydride compounds. Their aqueous solutions are very stable and they exhibit high electrical conductivity. This high conductivity demonstrates the high degree of ionic character of the novel compounds.

The process of step 1 of this invention is carried out simply by contacting at least two moles of an amine of the types described previously with one mole of a decaboryl bis(organic sulfide) of the formula $B_{10}H_{12} \cdot 2R'_2S$, wherein R' has the meaning defined above. Preferably, a large excess, e.g., up to a 10–20 fold excess, of the amine is employed whereby the excess amine acts as reaction medium. The excess amine can readily be recovered at the completion of the reaction. The reaction temperature is not critical, temperatures ranging from as low as −50° C. up to 100° C. or more being operable, the exact temperature being dependent on the particular amine being employed. When amines having a boiling points of less than 115° C. are employed, it is very convenient to carry out the reaction at the temperature at which the amine reactant refluxes. It is preferred that a reaction temperature below that at which the decaboryl bis(organic sulfide) decomposes be employed. For $B_{10}H_{12} \cdot 2(CH_3)_2S$, this temperature is approximately 115° C.

The reaction between the amine and the decaboryl bis-sulfide takes place quite rapidly, the exact time of reaction being dependent on the particular reactants and reaction temperature being employed. Reaction times ranging from a few minutes, e.g., 2–10 minutes, at the higher temperature in the above-mentioned range and from 10 minutes to 5 hours at the lower temperatures are sufficient.

The pressure under which the reaction is carried out is not critical. Atmospheric pressure is very convenient, but subatmospheric or superatmospheric pressure can be used if desired.

It is not necessary to use an added solvent or reaction medium in the process of this invention. The reaction takes place readily with the stoichiometric amount of amine and decaboryl bis-sulfide reactant, although the use of an excess of the amine is preferred. However, if it is desired, an inert reaction medium can be used. Examples of suitable inert reaction media include hydrocarbons, e.g., benzene, and ethers, e.g., tetrahydrofuran.

The amine salts of the $B_{10}H_{10}^{--}$ anion are readily isolated from the reaction mixture by conventional methods. The solid salt that is formed can be removed from the reaction mixture either by filtration or by evaporation of the solvent. The crude salt can be purified by extraction with water followed by evaporation of the solvent. In some cases it is convenient to simply remove the excess amine from the reaction medium by evaporation or distillation leaving the boron hydride amine salt as a residue.

It was stated earlier that the nitrogen bases employed in the process had in common the capacity of forming salts with hydrogen chloride. This common property can be determined readily by dissolving the base in a suitable solvent, e.g., diethyl ether, and bubbling HCl gas through the solution. The formation of a white precipitate or an oil shows that the base forms a salt with HCl.

The decaboryl bis(organic sulfide) used as one of the reactants in the process for the preparation of the amine salts can be prepared by the reaction of one mole of decaborane with two moles of an organic sulfide of the formula $R'_2S$, wherein $R'$ is monovalent hydrocarbyl, i.e., alkyl, aryl, cycloalkyl, alkenyl and cycloalkenyl (with the proviso that not more than one $R'$ is aryl), at a temperature between 0° and 100° C. until approximately one mole of hydrogen is evolved. This process is described in greater detail in U.S. application Serial No. 750,862, filed July 25, 1958, by E. L. Muetterties. In the above definition of $R'$, the monovalent hydrocarbyl group preferably is selected from the group consisting of alkyl radicals containing less than 6 carbon atoms each, and cycloalkyl radicals containing from 4 to 6 carbon atoms each. The most preferred $R'$ for use in this process is methyl. The amines used in this process can be any of the commercially available amines of the formulas given hereinbefore or they can be made by known methods.

The acid $H_2^{++}B_{10}H_{10}^{--} \cdot (H_2O)_m$ used in the process for the preparation of the substituted hydrazine salts can be prepared by treating an aqueous solution of a boron hydride salt obtained in step 1 of the process as outlined with a strongly acidic ion exchange resin. The preferred amine salts for this procedure have the general formula (9)      $(R^4{}_3NH)_2B_{10}H_{10}$ where $R^4$ is hydrogen or an alkyl radical. Preferably, a sulfonic acid type ion exchange resin is employed, for example, the types known commercially as "Amberlite" IR-120-H and "Dowex" resins.

The process and products of this invention are illustrated in further detail by the following examples.

EXAMPLE I

*Preparation of* $[(CH_3)_3CNH_3]_2B_{10}H_{10}$

Five grams of decaboryl bis(dimethyl sulfide) of the formula $B_{10}H_{12} \cdot 2(CH_3)_2S$ (2.5 millimoles) and 50 ml. of tert.-butylamine are mixed and heated at reflux temperature (approximately 45° C.) for 1.5 hours. The solid reaction product that is formed is removed by filtration and dried under vacuum (0.1 mm. of mercury). There is obtained 4.6 g. (83.5% of theory) of the boron hydride amine salt, $[(CH_3)_3CNH_3]_2B_{10}H_{10}$, in almost pure form.

*Analysis.*—Calc'd for $B_{10}C_8H_{34}N_2$: B, 40.6%; C, 36.06%; H, 12.86%; N, 10.51%. Found: B, 39.73%; C, 36.56%; H, 12.72%; N, 10.47%. A small amount of water-insoluble material is present in this product. This can easily be removed by extracting the $[(CH_3)_3CNH_3]_2B_{10}H_{10}$ with water. The aqueous solutions of this boron hydride salt have approximately the same equivalent conductance as equimolar solutions of ammonium chloride.

EXAMPLE II

*Preparation of* $[(C_2H_5)_2NH_2]_2B_{10}H_{10}$

Four grams (1.6 millimoles) of decaboryl bis(dimethyl sulfide), $B_{10}H_{12} \cdot 2(CH_3)_2S$, and 50 ml. of diethylamine are mixed in a reaction vessel fitted with a reflux condenser and the mixture is heated to reflux temperature (55° C.) for a period of 1 hour. The reaction mixture is filtered and there is obtained 4.0 g. of a white solid. Extraction of this solid with water followed by evaporation of the extracts gives a white crystalline solid, decomposition point 233–234° C., which is $[(C_2H_5)_2NH_2]_2B_{10}H_{10}$. Aqueous solutions of this salt are highly conducting.

*Analysis.*—Calc'd for $B_{10}C_8H_{34}N_2$: B, 40.70%; C, 35.7%; H, 12.8%; N, 10.5%. Found: B, 40.27%; C, 36.8%; H, 13.1%; N, 10.5%.

Aqueous extraction of the white solid formed as the reaction product of this example leaves a residue of 1.3 g. of a white, water-insoluble solid. This is a non-ionic isomer of the water-soluble ionic salt described above.

*Analysis.*—Calc'd for $B_{10}C_8H_{34}N_2$: B, 40.70%; C, 35.70%; H, 12.80%; N, 10.50%. Found: B, 40.12%; C, 32.11%; H, 11.85%; N, 10.48%.

The ionic isomer of Example II does not reduce silver nitrate in aqueous solution but the silver salt is formed instead. To illustrate, an aqueous solution of $[(C_2H_5)_2NH_2]_2B_{10}H_{10}$ is treated with dilute nitric acid until the solution is slightly acid. An aqueous solution of silver nitrate (ca. 10% concentration) is added dropwise and with stirring to the acidified solution until a large quantity of white precipitate forms. The reaction mixture is heated to boiling for a short period and no change in the color of the precipitate occurs, i.e., no reduction of the silver salt to free silver is noted.

EXAMPLE III

*Preparation of* $[(C_2H_5)_3NH]_2B_{10}H_{10}$

Decaboryl bis(dimethyl sulfide), $B_{10}H_{12} \cdot 2(CH_3)_2S$, (0.72 g.) and excess triethylamine (40 ml.) are mixed in a reaction vessel fitted with a reflux condenser and heated to reflux temperature (90° C.) for 10 minutes. On filtration of the reaction mixture, there is obtained 0.72 g. of a solid from which an ionic compound can be extracted with either water or tetramethylene sulfone. A white, solid, insoluble residue remains after the water extraction. Evaporation of the aqueous extracts leaves an ionic solid. The infrared absorption spectrum of this ionic solid is consistent with the formula $$[(C_2H_5)_3NH]_2B_{10}H_{10}$$

its identity as a salt of the boron hydride anion $B_{10}H_{10}^{--}$ is further demonstrated by its conversion to $$[(CH_3)_3S]_2B_{10}H_{10}$$

by reaction with aqueous trimethylsulfonium iodide. The ionic salt $[(C_2H_5)_3NH]_2B_{10}H_{10}$ has a decomposition point of 227–228° C. Aqueous solutions of this salt have approximately the same equivalent conductance as equimolar solutions of ammonium chloride.

The solid residue remaining from the extraction of the crude solid reaction product has the formula $$B_{10}H_{12} \cdot 2(C_2H_5)_3N$$

and is an isomer of the ionic salt $[(C_2H_5)_3NH]_2B_{10}H_{10}$.

*Analysis.*—Calc'd for $B_{10}C_{10}H_{43}N_2$: B, 33.60%; N, 8.68%. Found: B, 33.63%; N, 8.45%.

EXAMPLE IV

Decaboryl bis(dimethyl sulfide) (12.8 g.) and excess isopropylamine (100 ml.) are mixed in a reaction vessel fitted with a reflux condenser. Spontaneous refluxing occurs and the solid dissolves. The mixture is heated at reflux for an additional 2 hours. The reaction mixture is filtered and the filtrate is evaporated under slightly reduced pressure. The residue is dissolved in water, the solution filtered and the water evaporated. The residue of $(i\text{-}C_3H_7NH_3)_2B_{10}H_{10}$ is dried for 4 hours at 25° C. under a pressure of approximately 1 mm. Hg.

*Analysis.*—Calc'd for $B_{10}C_6H_{30}N_2$: B, 45.50%. Found: B, 44.09%.

In addition to the particular salts illustrated in Examples I–IV, the products of this invention also include other salts of Formula (2a) supra. These salts are preparable by the procedure of Example I by reacting one mole of the decaboryl bis(organic sulfide) compound with two moles of the amine:

zines used in step 3 of the process can be any of the commercially available hydrazines of this type or they can be made by known methods.

EXAMPLE X

An aqueous solution containing 2 g. of $(NH_4)_2B_{10}H_{10}$ is passed through a column containing the ion exchange resin, "Amberlite" IR–120–H. The aqueous effluent which contains the acid $H_2^{++}B_{10}H_{10}^{--}$, is neutralized by adding, 1,2-dimethylhydrazine $(CH_3NHNHCH_3)$ until the pH of the solution is 7. The solvent is evaporated to leave a slightly wet solid which is washed with a small amount of water and dried on a porous plate. The solid is shown by infrared analysis to be the 1,2-dimethylhydrazinimum salt of the $B_{10}H_{10}^{--}$ anion. The compound has the formula $[(CH_3)NH-(CH_3)NH_2]_2B_{10}H_{10}$. The presence of the $B_{10}H_{10}^{=}$ anion is confirmed by conversion of the hydrazinium salt to the tetramethylammonium salt by reaction with tetramethylammonium chloride.

Other organo-substituted hydrazine salts of the $B_{10}H_{10}$ anion are obtained by employing the process described in Example X. To illustrate, when phenylhydrazine or 1,1-dimethylhydrazine are substituted for the 1,2-dimethylhydrazine the salts obtained have the formulas $(C_6H_5NHNH_3)_2B_{10}H_{10}$ and $[(CH_3)_2NNH_3]_2B_{10}H_{10}$ Other salts which can be obtained in a similar manner from methylhydrazine, ethylhydrazine, and 1,1-diethylhydrazine are $(CH_3NH-NH_3)_2B_{10}H_{10}$, $(C_2H_5NH-NH_3)_2B_{10}H_{10}$ and $[(C_2H_5)_2N-NH_3]_2B_{10}H_{10}$, respectively.

Diamines can be employed in the process in place of monoamines. To illustrate, decaboryl bis(dimethylsulfide) can be reacted with ethylenediamine, 1,3-propylenediamine, 1,6-hexamethylenediamine or 1,4-diaminocyclohexane to obtain the corresponding boron hydride-diamine salts.

The decaboryl bis(dimethyl sulfide) used in Examples I–IV and VII can be replaced by any other decaboryl bis(organic sulfides) of the formula $B_{10}H_{12} \cdot 2R'S$, where R' has the significance defined previously. Thus, derivatives of decaborane with the following specific organic sulfides can be used in the process of this invention: di-n-propyl, di-n-butyl, methyl p-tolyl, dicyclohexyl, dicyclohexenyl, dioctyl, diallyl, divinyl, allyl benzyl, and tetramethylene sulfides. While any of these decaboryl bis(or-

TABLE I

| Example No. | Reactants | | Products |
|---|---|---|---|
| V | $CH_3NH_2$ | $B_{10}H_{12} \cdot 2(C_2H_5)_2S$ | $(CH_3NH_3)_2B_{10}H_{10}$ |
| VI | $(n\text{-}C_3H_7)_2NH$ | 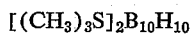 | $[(n\text{-}C_3H_7)_2NH_2]_2B_{10}H_{10}$ |
| VII | $(CH_3)(n\text{-}C_4H_9)NH$ | $B_{10}H_{12} \cdot 2(CH_3)_2S$ | $[(CH_3)(n\text{-}C_4H_9)NH_2]_2B_{10}H_{10}$ |
| VIII | $(n\text{-}C_{11}H_{23})NH_2$ | $B_{10}H_{12} \cdot 2(n\text{-}C_8H_{17})S$ | $[(n\text{-}C_{11}H_{23})NH_3]_2B_{10}H_{10}$ |
| IX | $(CH_3)(n\text{-}C_7H_{15})NH$ | $B_{10}H_{12} \cdot 2(CH_2=CH)_2S$ | $[(CH_3)(n\text{-}C_7H_{15})NH_2]_2B_{10}H_{10}$ |

The preparation of free acids containing the $B_{10}H_{10}^{=}$ anion (step 2) is accomplished by treatment of the amine salt with an acidic ion exchange resin, e.g., "Amberlite" IR–120–H. The aqueous solution of the amine salt is conveniently passed through a cylindrical reaction tube packed with the ion exchange resin. Any operating temperature between the freezing point and boiling point of water can be used. The boron-containing acid is soluble in water and can be isolated from the clear, colorless, aqueous effluent by evaporation of the water at moderately elevated temperatures, e.g., 30–40° C., preferably under reduced pressures, e.g., 0.1–5 mm. of mercury. This process is described in greater detail in U.S. patent application Serial No. 6,855, filed February 5, 1960, by myself. The amines and substituted hydraganic sulfides) are operable, it is preferable from a practical standpoint to use the decaborane derivatives of readily available low molecular weight sulfides, especially dimethyl sulfide and diethyl sulfide, since it is the decaborane moiety of the derivative that forms part of the salts of the present invention. The organic sulfide moiety is a by-product of the reaction which can be recovered if desired for reuse.

The products of this invention are useful for a variety of purposes. For example, aqueous solutions of the amine and substituted hydrazine salts of the anion $B_{10}H_{10}^{--}$ are useful as electrolytes. These electrolytes are useful in many electrical applications including electrical switches, where good electrical contact is desired.

All the amine and substituted hydrazine salts of this invention are inflammable in contact with excess concentrated nitric acid. This particular property makes the products of this invention useful as components of rocket fuels.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound having the formula selected from the group consisting of

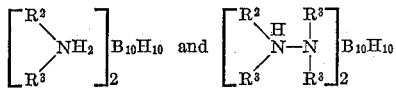

wherein $R^2$ is monovalent hydrocarbon; and $R^3$ is selected from the group consisting of hydrogen and monovalent hydrocarbon; the group bonded to $B_{10}H_{10}^{--}$ being derived from the class consisting of primary amines, secondary amines and organo-substituted hydrazines which can form salts with hydrochloric acid.

2. A compound having the formula

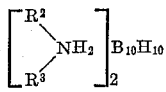

wherein $R^2$ is monovalent hydrocarbon; and $R^3$ is selected from the group consisting of hydrogen and monovalent hydrocarbon; and wherein the group bonded to $B_{10}H_{10}^{--}$ is derived from the class consisting of primary amines and secondary amines which can form salts with hydrochloric acid.

3. A compound having the formula

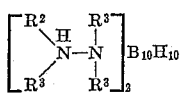

wherein $R^2$ is monovalent hydrocarbon; and $R^3$ is selected from the group consisting of hydrogen and monovalent hydrocarbon; and wherein the group bonded to $B_{10}H_{10}^{--}$ is derived from organo-substituted hydrazines which can form salts with hydrochloric acid.

4. $[(CH_3)_3CNH_3]_2B_{10}H_{10}$.
5. $[(C_2H_5)_2NH_2]_2B_{10}H_{10}$.
6. $(i-C_3H_7NH_3)_2B_{10}H_{10}$.
7. $[(CH_3)NH-(CH_3)NH_2]_2B_{10}H_{10}$.

8. In a process for preparing a compound selected from the class consisting of

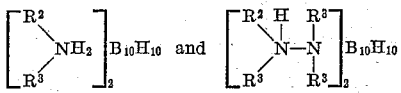

wherein $R^2$ is monovalent hydrocarbon; and $R^3$ is selected from the group consisting of hydrogen and monovalent hydrocarbon; the group bonded to $B_{10}H_{10}^{=}$ being derived from the class consisting of primary amines, secondary amines and organo-substituted hydrazines which can form salts with hydrogen chloride, the step of contacting an aqueous solution of the acid $$H_2B_{10}H_{10}$$

with a nitrogen base selected from the class consisting of

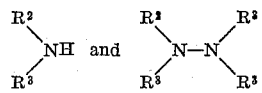

wherein $R^2$ and $R^3$ are defined as above.

9. In a process for making a compound of the formula $$(R_{3-n}NH_{n+1})_2B_{10}H_{10}$$

wherein R is selected from the group consisting of alkyl, alkenyl, cycloalkyl and cycloalkenyl, and $n$ is an integer of at most 2, the step of reacting one mole of a compound having the formula $$B_{10}H_{12} \cdot 2(R')_2S$$

wherein R' is a monovalent hydrocarbon radical provided that not more than one R' is aryl with at least two moles, based on available amine groups, of an amine having the formula $$R_{3-n}NH_n$$

wherein R and $n$ have their above-defined meanings.

10. In a process for making a compound of the formula $$(R_{3-n}NH_{n+1})_2B_{10}H_{10}$$

wherein R is selected from the group consisting of alkyl, alkenyl, cycloalkyl and cycloalkenyl, and $n$ is an integer of at most 2, the step of reacting one mole of a compound having the formula $$B_{10}H_{12} \cdot 2(R')_2S$$

wherein R' is a monovalent hydrocarbon radical provided that not more than one R' is aryl with an excess of an amine having the formula $$R_{3-n}NH_n$$

wherein R and $n$ have their above-defined meanings while maintaining temperatures between $-50°$ and $115°$ C.

References Cited in the file of this patent

Hawthorne et al.: J.A.C.S., vol. 81, p. 5519 (1959),